United States Patent
Reyes et al.

(12) 
(10) Patent No.: US 6,726,850 B1
(45) Date of Patent: Apr. 27, 2004

(54) CATALYTIC PARTIAL OXIDATION USING STAGED OXYGEN ADDITION

(76) Inventors: Sebastian C. Reyes, 9 Mohawk Trail, Branchburg, NJ (US) 08876; Jennifer S. Feeley, 652 Plantation Ridge Dr., Baton Rouge, LA (US) 70810; Frank Hershkowitz, 509 Lyons Rd., Liberty Corner, NJ (US) 07938; Harry W. Deckman, 2 Woods Edge Ct., Clinton, NJ (US) 08809; Ioannis P. Androulakis, 826 Primrose Ct., Belle Mead, NJ (US) 08502

( * ) Notice: Subject to any disclaimer, the term of this patent is extended or adjusted under 35 U.S.C. 154(b) by 0 days.

(21) Appl. No.: 09/484,378

(22) Filed: Jan. 14, 2000

(51) Int. Cl.$^7$ .................................................. C01B 3/26
(52) U.S. Cl. .................... 252/373; 252/376; 423/418.2; 423/651; 585/250
(58) Field of Search ................................. 252/373, 376; 423/418.2, 648.1, 650, 651; 585/250; 208/142

(56) References Cited

U.S. PATENT DOCUMENTS

| | | | | |
|---|---|---|---|---|
| 5,510,056 A | * | 4/1996 | Jacobs et al. ................ | 252/373 |
| 5,886,056 A | * | 3/1999 | Hershkowitz et al. ...... | 518/703 |

FOREIGN PATENT DOCUMENTS

| | | | |
|---|---|---|---|
| EP | 0330751 | 9/1989 | ............. C01B/3/38 |
| EP | 0 842 894 A1 * | 5/1998 | |
| EP | 0842894 | 5/1998 | ............. C01B/3/38 |
| GB | 2274284 | 7/1994 | ............. C01B/3/38 |

OTHER PUBLICATIONS

Y. Boucouvalas et al, "Partial oxidation of methane to synthesis gas via the direct reaction scheme over Ru/RiO$_2$ Catalysis"; Catalysis Letters, vol. 40, (1996), pp. 189–195.

* cited by examiner

Primary Examiner—Steven P. Griffin
Assistant Examiner—Maribel Medina

(57) ABSTRACT

A multistage catalytic partial oxidation (CPO) process for oxidizing a hydrocarbon feedstream comprising $C_1$–$C_4$ hydrocarbons, with an oxygen-containing feedstream to produce a product comprising CO and $H_2$, also known as synthesis gas or syngas. The process employs a CPO catalyst, and controlled process features, including: (A) the total oxygen requirement for the process is introduced incrementally, in more than one reaction stage, using an oxygen-containing feedstream at more than one feed point in the process, each stage including a catalyst; (B) the oxygen-containing feedstream, hydrocarbon feedstream and, in reaction stages after the first of said multiple stages, the intermediate product produced in the prior stage, are mixed for a period of time, after they are brought into contact with one another, of less than about 1 millisecond to form a substantially uniform mixture, wherein the mixture is then contacted with the catalyst; (C) the oxygen-containing feedstream and the hydrocarbon feedstream are preheated prior to entry into the first stage, to a temperature of from about 450° C. to less than about 1,000° C.; and (D) the mixture temperature of the product in each stage following the first stage is from greater than about 600° C. to less than about 1,000° C. Preferably, the process comprises less than or equal to about five stages, the first stage preheat temperature recited in step (C) is greater than about 550° C. and the mixture temperature of the product in each stage following the first stage is at least 700° C.

21 Claims, No Drawings

CATALYTIC PARTIAL OXIDATION USING STAGED OXYGEN ADDITION

FIELD OF THE INVENTION

Catalytic partial oxidation (CPO) of low carbon number hydrocarbon feed streams, such as methane, to produce useful products, such as mixtures of hydrogen and carbon monoxide, the latter mixture also known as synthesis gas or syngas. Syngas is useful for the preparation of a variety of other valuable chemical compounds, such as by application of the Fischer-Tropsch process.

BACKGROUND OF THE INVENTION

The combustion of methane gas at elevated temperature, e.g., 1000° F. (538° C.) is highly exothermic and produces $CO_2$ and $H_2O$ according to the following stoichiometry:

$$CH_4 + 2O_2 \rightarrow CO_2 + 2H_2O \quad (-190.3 \text{ kcal/g mol } CH_4)$$

The gases formed in such a reaction are not directly useful for the production of valuable chemical compounds, and the high temperatures generated present problems with respect to reactors, catalysts and other process equipment if efforts were made to produce valuable products from water and carbon dioxide.

Conversely, it is known to produce a chemically useful mixture of CO and $H_2$ gases, also known as synthesis gas or syngas, from methane and other light hydrocarbon gases, by various reactions, including partial oxidation, steam- or $CO_2$-reforming, or a combination of these chemistries. The partial oxidation reaction of methane is a less highly exothermic reaction which, depending upon the relative proportions of the methane and oxygen and the reaction conditions, can proceed according to the following reaction paths:

| | |
|---|---|
| $CH_4 + O_2 \rightarrow CO + H_2 + H_2O$ | $(-64 \text{ kcal/g mol } CH_4)$ |
| $2CH_4 + 1.5O_2 \rightarrow 2CO + 3H_2 + H_2O$ | $(-34.9 \text{ kcal/g mol } CH_4)$ |
| $CH_4 + \frac{1}{2}O_2 \rightarrow CO + 2H_2$ | $(-5.7 \text{ kcal/g mol } CH_4)$ |

It is most desirable to enable the partial oxidation reaction to proceed according to the last reaction scheme. This results in certain advantages: including (1) producing the most valuable syngas mixture; (2) minimizing the amount of heat produced (thereby protecting the apparatus and the catalyst bed); and (3) reducing the formation of steam (thereby increasing the yield of hydrogen and carbon monoxide). Any incidentally produced, or added, steam can be further converted by the steam-reforming reaction into additional useful syngas components.

Jacobs et al., U.S. Pat. No. 5,510,056 (Shell) discloses that successful operation of a CPO process on a commercial scale requires high conversion of the hydrocarbon feedstock at high space velocities, using mixtures of an oxygen-containing gas and methane in a preferred $O_2$ to carbon atom ratio (in the region of the stoichiometric ratio of about 1:2, or 0.5), which mixtures are preferably preheated and at elevated pressures. The advance described in Jacobs is directed to the specifics of the catalyst support.

It is disclosed in EP 303 438 (assigned to Davy McKee Corp.), to conduct a CPO process using previously formed mixtures of high temperature, high pressure methane and oxygen gases and, optionally, steam at space velocities up to 500,000 $hr^{-1}$, using a mixing and distributing means in order to thoroughly premix the gases prior to introduction to the catalyst. It is the objective in this disclosure to operate the CPO process in a mass-transfer-controlled regime and to introduce the gas mixture at or above its autoignition temperature.

EP 842 894 A1 discloses a process and apparatus for catalytic partial oxidation of a hydrocarbon wherein the use of several stages is proposed. The reference states that in each stage there is used "a small fraction of the stoichiometric amount of oxygen required for the reaction" to prevent the generation of high temperatures in the reactor as a consequence of "excessive" concentrations of oxygen. Furthermore, it is disclosed that the hydrocarbon feed is mixed with oxygen and preheated to a temperature in the range of 300–400° C. and the reaction is performed at substantially the same temperature in all stage by cooling the reaction mixture in each stage.

GB Patent Application 2311790 discloses a two stage process and the use of a specifically defined catalyst whereby in a second stage a second synthesis gas is produced utilizing a first synthesis gas, as feed gas, with oxygen to cause partial oxidation of unreacted methane.

Staged oxygen addition has been disclosed as providing possible improvements solution to some of the difficulties encountered in CPO processes. "$CO_2$ Reforming and Partial Oxidation of Methane," Topics in Catalysis 3 (1996) 299–311, recommends a staged addition of $O_2$ to the reactor during methane oxidation in a two stage process, including total methane oxidation followed by reforming in the presence of the formed $CO_2$ and $H_2O$. Oxygen staging is said to lead to a flattening of the temperature profile along the reactor. However, it is also stated that "lowering the $O_2/CH_4$ ratio will make carbon deposition thermodynamically more favorable and thus lead to deactivation of the catalyst." (Id., p.308). The experimental results reported in this reference are expressed as a function of the catalyst-bed exit temperature rather than feed temperature.

"Partial Oxidation of Methane to Synthesis Gas via the Direct Reaction Scheme Over $Ru/TiO_2$ Catalyst," Catalysis Letters 40 (1996) 189–195, discusses achieving an increase in selectivity to syngas in the presence of oxygen over a $Ru/TiO_2$ catalyst by multi-feeding oxygen. The increase is attributed to suppression of deep oxidation of $H_2$ and CO. Based on observations therein, the authors imply that "if oxygen is fed along the length of the catalyst bed instead of only at the entrance . . . and its local partial pressure is maintained at low levels, CO selectivity via the direct reaction scheme may be increased by attenuating oxidation of methane to $CO_2$." (Id., p.194).

"Methane Conversion to Ethylene and Acetylene: Optimal Control with Chlorine, Oxygen and Heat Flux," Ind. Eng. Chem. Res. 35 (1996) 683–696, discloses conversion of methane to ethylene with controlled oxygen and heat flux. The process was conducted in the gas phase, i.e., the reference is directed to a non-catalytic gas phase methane reaction. Furthermore, oxygen is not present in the reactor initially; rather it was used as a manipulative variable.

"Kinetic-Transport Models of Bimodal Reaction Sequences-1. Homogeneous and Heterogeneous Pathways in Oxidative Coupling of Methane," Chemical Engineering Science, 48 (1993) 2643–2661, discloses a reaction transport model. Staging oxygen introduction along the reactor length is found to minimize secondary oxidation reactions by lowering the local $O_2$ pressures, which leads to a slight increase in maximum yield, but also requires much larger reactor volumes. However, oxidative coupling differs from the technology disclosed by the present inventors in that it has as its objective the production of ethane and ethylene, rather than CO and $H_2$ (i.e., syngas).

"Partial Oxidation of Methane to Syngas Using Fast Flow Membrane Reactors," ACS Div. Fuel Chem. Reprints 42(2) Apr. 13, 1997, discloses the use of a double bed reactor wherein both beds can be operated autothermally if oxygen is used as the downstream feed instead of carbon dioxide. The temperature of the second bed rapidly increases upon introduction of the downstream oxygen feed.

While the above references disclosed certain aspects of CPO and staged oxygen addition, there still exists a need for a CPO process that avoids undesirable gas phase reactions and maximizes yield and selectivity.

SUMMARY OF THE INVENTION

A multistage catalytic partial oxidation (CPO) process for oxidizing a hydrocarbon feedstream comprising $C_1$–$C_4$ hydrocarbons, with an oxygen-containing feedstream to produce a product comprising CO and $H_2$, said process conducted under CPO conditions in the presence of a CPO catalyst, wherein:

(A) the total oxygen requirement for said process is introduced incrementally from an oxygen-containing feedstream, the first of said incremental additions taking place in a first reaction stage, and subsequent said incremental additions taking place in at least one subsequent reaction stage, each said stage including said catalyst;

(B) in said first reaction stage said oxygen-containing feedstream and said hydrocarbon feedstream are mixed, and in said subsequent reaction stages, said oxygen-containing feedstream and the intermediate product produced in the prior stage are mixed; said mixing in said first stage occurring in a mix time of less than about 10 milliseconds and in said subsequent stages said mixing of said oxygen-containing feedstream and said intermediate product occurring in a mix time of less than about 1 millisecond, wherein said mix time is defined as the time when said hydrocarbon and said oxygen-containing feedstreams or said intermediate product and said oxygen-containing feedstream are brought into contact with one another and up to the time said mixture is contacted with said catalyst, to form a mixture, wherein said mixture is contacted with said catalyst;

(C) said oxygen-containing feedstream and said hydrocarbon feedstream are preheated prior to entry into said first stage, to a mixture temperature of from about 450° C. to less than about 1,000° C.; and (D) the mixture temperatures of said product in each stage following said first stage is from greater than about 600° C. to less than about 1,000° C.

Preferably, the process comprises less than or equal to about five stages, the first stage preheat temperature recited in step (C) is greater than about 550° C. and the temperature of the product mixture in each stage following said first stage is at least about 700° C.

DETAILED DESCRIPTION OF THE INVENTION

It is believed that CPO proceeds primarily by very fast metal-catalyzed steps that are only mildly exothermic. A key challenge in CPO is the need to operate at extremely high space velocities in order to suppress the contribution from non-selective gas-phase oxidation reaction pathways; this problem becomes particularly difficult to overcome at high temperatures and pressures.

In the operation of a staged CPO process it is desirable to reduce gas phase reactions to the maximum extent possible (and most preferably to eliminate such reactions) and, instead, to operate under conditions wherein all partial oxidation reactions occur on a highly active catalyst surface. In this way, the hydrocarbon feed is converted catalytically at such a high rate or low dwell time, that gas phase reactions or undesirable combustion stoichiometry (e.g., poor selectivity), do not have an opportunity to occur. In order to accomplish these objectives it is also necessary that the gases fed to a CPO catalyst be thoroughly premixed and the process be operated under specifically controlled conditions. Avoidance of gas phase reactions will also avoid damage to the catalyst, including physical damage as well as reduced activity and undesirable combustion reactions. Also, CPO catalysts generally do not exhibit such high levels of steam or $CO_2$ reforming activity that would permit them to reform over-oxidized gas compositions at the high space velocities employed in CPO processes.

It is especially important to provide the premixed feed under controlled preheat conditions as well as controlled interstage temperature conditions and at high space velocity to enable the desired catalytic reaction of the premixed gases to occur at short contact times. An appropriately controlled catalytic partial oxidation process has the potential to provide extraordinary reactor productivity in view of the extremely high space velocities of the throughput if the aforementioned problems are avoided or at least significantly reduced.

It is an objective of the present invention to improve the selectivity and efficiency of the catalytic partial oxidation process, resulting in higher methane conversion and higher $H_2$ and CO concentrations in the syngas.

The hydrocarbon and oxygen reaction mixture utilized in the instant invention to produce partial oxidation products need not be pure. $H_2O$ and $CO_2$, may be present in the hydrocarbon stream introduced in relatively large amounts, such as from about 0.0 to 1.0 mole of $H_2O$ or $CO_2$ per carbon atom of hydrocarbon to be oxidized. Other components, for example, $H_2$, CO, Ar, $N_2$, $NH_3$, HCN, $H_2S$, COS, $CS_2$, organic sulfur-containing compounds, organic oxygenates, methane, and $C_2$+ hydrocarbons may be present in lower concentrations, typically less than 0.10 mole of the component per carbon atom of the hydrocarbon being oxidized. The stream comprising oxygen may likewise contain components other than oxygen. These components are typically $N_2$, $CO_2$, $H_2O$, and Ar. Some of these components, especially $N_2$, $CO_2$, and $H_2O$, may be present in amounts, from 0.0 to 4.0 mole per mole of oxygen ($O_2$). Other components (for example, as identified above) are typically present in amounts normally less than 0.1 mole of component per mole $O_2$.

In one embodiment of the present invention, the principal component being oxidized is light hydrocarbon gas comprising methane. Typical hydrocarbon feeds that are used in catalytic partial oxidation include methane, natural gas, individual and mixtures of light ($C_2$–$C_4$) hydrocarbons, individual and mixtures of heavier ($C_5^+$) hydrocarbons, as well as olefins, aromatics, and oxygenates. More typically, saturated hydrocarbons are used as feed, and the partial oxidation products comprise synthesis gas, unsaturated hydrocarbons, oxygenated hydrocarbons, and combinations thereof.

In the CPO process, a well-mixed reaction gas mixture comprising an oxygen-containing feed and a feed comprising one or more hydrocarbons selected from the group consisting of $C_1$–$C_4$ compounds is contacted with a fixed bed of particulate or monolithic catalyst, wherein conversion occurs at extremely high rates. When the process is operated at high pressure and at very high gas hourly space velocities, or GHSV; velocities as high as 1,000,000 hr.$^{-1}$ or more, e.g., velocities of 10,000,000 hr.$^{-1}$ or more can be encountered. For purposes of the present disclosure, GHSV is calculated as the flow rate of the gases at "standard" temperature and pressure, i.e., 1 atm/101.3 kPa and 68° F./20° C., divided by the total volume of the catalyst; for purposes of this definition, the total catalyst volume refers to the same aspect of the process as does GHSV, e.g., the overall process or one or more stages being considered in a multistage process. Furthermore, the use of active catalysts is preferred, among other process control variables, in order to avoid gas phase chemical reactions. Applicants have discovered that staged introduction of the oxygen feed during the CPO process and specific control of the temperature profile of the feed and the stages results in a more efficient process and improved selectivity, i.e., production of the desired syngas components, $H_2$ and CO in high yields.

The process of the present invention is not limited by the pressure employed in the process and may be operated at any suitable pressure, including from about one atmosphere (0.1 MPa) and higher. For certain commercial operations, elevated pressures, that is pressures significantly above atmospheric pressure, may be preferred, but the nature of the application will dictate the pressure to be utilized in the operation of the invention disclosed herein. The process may be operated at pressures in the range of up to about 50 atmospheres (about 5.0 MPa) or more. When employed in lower pressure applications, the process is operated at pressures in the range of from about 1 to about 10 atmospheres (about 0.1 to about 1.0 MPa); for example, from about 1 to about 5.0 atmospheres (about 0.1 to about 0.5 MPa). In higher-pressure applications, pressures of from greater than about 5 to about 50 atmospheres and higher (about 0.5 to about 5.0 MPa and higher) may be encountered; for example from greater than about 10 to about 30 atmospheres (about 1.0 to about 3.0 MPa). In various commercial applications, it is not uncommon for a CPO process to be integrated within a broader operation or process, e.g., in the processing of a hydrocarbon stream and/or in a petrochemical process. Generally, pressure in the CPO process may be determined by economic and/or process factors relating to its use as an element in an overall process.

Catalyst compositions suitable for use in the catalytic partial oxidation of hydrocarbons are known in the art. Preferred catalysts for use in the process of the present invention comprise, as the catalytically active component, a metal selected from the group consisting of Group VIII of the Periodic Table of the Elements. References in this specification to the Periodic Table of the Elements are to the CAS version, as published in the CRC Handbook of Chemistry and Physics, 69th Edition. Preferred catalysts for use in the process comprise at least one metal selected from the group consisting of nickel, ruthenium, rhodium, palladium, osmium, iridium and platinum. Catalysts comprising at least one of ruthenium, rhodium or iridium as the catalytically active metal are most preferred for use in the process; in particular, a catalyst comprising at least rhodium is preferred.

The catalytically active metal is most suitably supported on a carrier. Suitable carrier materials are well known in the art and include the refractory oxides such as silica, alumina, titania, zirconia and mixtures thereof. Mixed refractory oxides, that is, refractory oxides comprising at least two cations, may also be employed as carrier materials for the catalyst.

The catalytically active metal may be deposited on a refractory oxide carrier by techniques well known in the art. A particularly suitable technique for depositing the metal on the carrier is impregnation, which technique typically comprises contacting the carrier material with a solution, dispersion or suspension of a compound of the catalytically active metal, followed by drying and calcining the resulting material. The catalytically active metal, for example rhodium, can be applied as part of a washcoat, for example, an alumina-based washcoat. Generally, the rhodium content will be from about 2 to about 20% by weight; preferably from about 4 to about 12% by weight in the washcoat. The washcoat loading, expressed as grams of washcoat per cubic inch of catalyst bed, will be from about 0.1 to 2.0; preferably from about 0.2 to about 1.0 g/cubic inch. Similarly, a preferred monolithic support such as ceramic foam is selected so to obtain a desired property, e.g., the number of pores per inch, ppi. Generally, a ceramic foam support will have from about 25 to about 150 ppi; preferably from about 30 to about 100 ppi.

As used in the process of the present invention, the catalyst preferably is retained in form of a fixed arrangement. The fixed arrangement may comprise a fixed bed of catalyst particles. Alternatively, the fixed arrangement may comprise the catalyst in the form of a monolith structure. The fixed arrangement may consist of a single monolith or particulate structure or, alternatively, may comprise a number of separate monolith and/or particulate structures combined to form the fixed arrangement in one or more stages. A preferred monolith structure comprises ceramic foam. Suitable ceramic foams for use in the process of the present invention are available commercially.

By practicing the process of the present invention, staged-oxygen CPO can provide higher yields and selectivities than conventional (co-fed or single-stage) CPO, provided that several specific process conditions are incorporated into the process in order to provide a workable process capable of higher yields and selectivities. It has surprisingly been found that the chemistry of the catalyst in a staged-oxygen CPO process becomes substantially more selective at higher temperatures, and that specific requirements for feed preheat and inter-stage cooling must be met in order to preserve the high yields and selectivities. In particular, the reactivity behavior of the gaseous premix for intermediate stages of a staged-oxygen CPO process leads to an unexpected need to carefully manage the inter-stage mixing time, and leads to an unexpected preference for an intermediate number of stages. These key features are further described in detail below.

A significant advantage of staged-$O_2$ CPO is its ability to provide higher yields and selectivities than can be achieved with co-fed CPO (in which the oxygen-containing feed and the hydrocarbon feed are introduced concurrently in a single stage process). Pursuant to the present invention, the inventors have also found that higher yields and selectivities are significantly related to maintaining high interstage temperatures. Following the first stage, mixture temperatures between stages (i.e., the temperature at the inlet to the catalyst bed, representing the temperature of the mixed stream) should be kept above about 600° C., and more preferable above about 700° C. It is also desirable to keep such interstage mixture temperatures below about 1,000° C.; preferably interstage mixture temperatures should be from about 600° C. to about 1,000° C.; more preferably, from about 650° C. to about 950° C.; most preferably, from about 700° C. to about 900° C. Interstage cooling may be employed, but only to the extent that temperatures remain within these specified ranges. Generally, it will be understood that the temperatures of individual streams, e.g., initial feedstreams to the process, an intermediate oxygen-containing feedstream or an intermediate product within the process, can differ from one another and from the temperature of a mixture of one or more of such streams specified at a point in the process.

An important economic driver in syngas generation is product ($CO$, $H_2$) yield. Yield may be diminished by low conversion (unreacted $CH_4$), or by low selectivity (e.g., production of undesirably high levels of $H_2O$ and/or $CO_2$). For the range of catalysts under consideration herein, yields improve as interstage mixture temperature rises to above about 600° C., and especially to above about 700° C. Two coincident effects are involved. First, thermodynamic equilibrium shifts with increasing temperature to higher yields of syngas. Second, the ability of the catalyst to preferentially oxidize methane in the presence of CO and $H_2$ increases with temperature. The latter effect is particularly important in between stages, leading to a requirement for interstage mixture temperature that is higher than the requirement for initial feed mixture temperature (stage 1). The feed mixture temperature (stage 1) should be above about 450° C.; preferably above about 500° C., more preferably above about 550° C.; in each instance, the stage 1 feed mixture temperature should be less than about 1,000° C. When convenient to the overall process to provide a higher feed mixture temperature, a particularly preferred feed mixture temperature range is from about 600° C. to about 800° C.

For purposes of the present invention, several process criteria can be calculated and used as measures of performance. One such measure is "prorated" conversion, expressed as moles of $CH_4$ converted per ½ mole of 02 in the feed. It is calculated as:

Prorated $CH_4$% conversion=½($CH_4$ in–$CH_4$ out)×100/($O_2$ in)

Prorated conversion provides a convenient means of characterizing the performance of each stage of a multistage process. In contrast, overall $CH_4$ conversion achieved in the process can be expressed as:

Overall conversion=($CH_4$ in–$CH_4$ out)×100/$CH_4$ in

Furthermore, selectivity for the production of hydrogen and carbon monoxide from methane in the feed is expressed as:

% CO Selectivity=(CO out–CO in)×100/($CH_4$ in–$CH_4$ out)

% $H_2$ Selectivity=½($H_2$ out–$H_2$ in)×100/($CH_4$ in–$CH_4$ out)

Compared to prior art processes, practice of staged CPO technology as taught herein can result in high levels of both methane conversion and product selectivity; e.g., levels of both characteristics concurrently approaching or even exceeding 95%.

A conventional justification for employing a staged oxygen CPO scheme is the expectation that dividing the oxygen between many stages will result in lower oxygen concentration between stages, and thus reduce the possibility, or prevent, gas-phase reaction leading to high temperatures. (e.g., EP 0 842 894 A1 at page 2, col. 2, line 14). However, it has been found that the reactivity of gaseous mixtures between stages in a multistage CPO process as disclosed herein can actually be much higher that the reactivity of similar feed mixtures in a co-fed (or single-stage) CPO process. For example, at interstage temperatures such as above 600 ° C., gas mixtures containing moderate concentrations of both oxygen and synthesis gas are highly reactive.

Consider, for example, the induction times for reaction as calculated using a kinetic model; shorter induction times reflect higher reactivity. Induction times, as defined here, represent the time for the reaction to achieve 50% oxygen conversion, as calculated using a kinetic model under perfect plug-flow adiabatic conditions. It is known that fuel/oxidizer mixtures under these conditions will spend a large fraction of the induction time slowly building up heat and radicals, until some critical level is achieved and combustion then proceeds very quickly. The chemical mechanism used for the calculation is taken from Mims, et. al. (J. Phys. Chem., 98 (1994) 13357–13372). While the absolute values of the induction times are sensitive to the specific models used, the general magnitude of the values, and the key trends could be developed with alternate gas-phase mechanisms for methane oxidation. (Induction times for actual systems are typically shorter than those calculated using a kinetic model, as herein, due to diffusion, dispersion, and recirculation effects that carry heat and radicals upstream from downstream locations).

For a 0.5:1 $O_2/CH_4$ mixture at practical conditions of 500° C. preheat temperature and 25 atm pressure, the calculated induction time would be 384 milliseconds. In contrast, using an oxygen/syngas mixture at a lower oxygen concentration (e.g., based on stage 2 of a two stage process, idealized as: ⅖ $CH_4$, ⅖ CO, ⅘ $H_2$, ⅕ $O_2$) but at controlled interstage conditions of 700° C. and 25 atm, would result in an induction time of only 1 millisecond. As can be seen, the reactivity of the hydrocarbon/$O_2$ mixture rises significantly faster with temperature than any attenuation of reactivity due to reduced oxygen concentration. Indeed, the presence of the syngas in the interstage mixture limits the attenuation of reactivity that is due to reduced oxygen concentration, by providing a highly reactive hydrogen component to the hydrocarbon mixture.

It will be recognized by those skilled in the art, that the gaseous premix formed when the hydrocarbon stream and the oxidant stream are introduced into the mixing zone will not be perfectly mixed at the point of initial contact. In any real physical device, some time or distance will be required before perfect mixing is achieved. As used herein, the term "feed stream" means the individual streams, such as hydrocarbon or oxygen containing gas, that are being fed to the mixing zone, and the term "mixture" means the physical combination of these feed streams in a state that is highly mixed. It is important that the feed streams achieve a high degree of mixing in a minimum amount of time, and before gas phase or catalytic reactions begin to occur at any substantial level. In order to quantify this degree of mixing, the measure "Efficiency of Mixing", abbreviated as $E_m$, is used.

$E_m$ is calculated from the composition profile of the mixture stream. Composition profiles can be obtained by sampling the stream at many locations, or by use of other diagnostic tools. For example, imaging the Rayleigh-scattered light of a laser beam can, under properly controlled conditions, provide composition variations across partially mixed streams. Typically, a "slice" in a plane substantially perpendicular to the gas flow, i.e., across the reactor, is sampled. In particular, such samples will be measured in the region just prior to entry of the gas mixture into the catalyst. The composition data is used to calculate how much of each feed stream is present at each location in the sampled plane. For example, if one were mixing air with methane, the oxygen and nitrogen mole fractions would be combined to represent the mole fraction of the air stream.

For the case where hydrocarbon-containing (abbreviated HC) and oxygen-containing (abbreviated OX) feed streams are being mixed, $E_m$ is defined using the following equation:

$$E_m=((X_{HC}/X_{OX})_{MIN}/(X_{HC}/X_{OX})_{MAX})^{0.5}$$

where $X_{HC}$ and $X_{OX}$ represent mole fractions in the mixture of hydrocarbon-containing gas and oxygen-containing gas, and the subscripts "MIN" and "MAX" designate that these are the minimum and maximum ratios found in the mixture. Thus, $(X_{HC}/X_{OX})_{MIN}$ represents the minimum HC/OX mole fraction ratio found in the composition profile. As so defined, $E_m$ reaches a value of 1.0 when the gases are perfectly mixed, and will have a value of 0.0 if the stream has any locations that are completely unmixed (a location where the composition is equal to that of either feed stream). Since the final, limited amount of oxygen is added in the last stage it is preferred that $E_m$ in that stage be better, i.e. higher, than in earlier stages (or for the overall process) in order to avoid formation of $H_2O$ and $CO_2$. For example, while $E_m$ for the early stages of the process may be about 0.7 to about 0.8, it is preferred that $E_m$ in the last stage be greater than about 0.9. The process described herein can also be operated in a rapid injection mode, such as described in U.S. Pat. No. 5,883,138 (F. Hershkowitz et al.), the disclosure of which is incorporated herein by reference thereto.

For purposes of the present invention, the mixing time is defined as the duration of time after addition of $O_2$ and up to the time of entry of the mixture of hydrocarbon and oxygen into the catalyst. In contrast, the total time in a stage is measured from the time the hydrocarbon feed first enters the reactor, or a product mix, including unreacted hydrocarbon, if any, leaves the catalyst from a prior stage, until the time a product mixture first begins to exit the next catalyst (the total time is not a critical performance variable for the present invention). Therefore, as defined, mixing time begins upon first contact of $O_2$ with the flowing stream (either the initial hydrocarbon feed or the product stream from a prior stage), and ends when the mixed stream enters the catalyst. Necessarily, mixing requires a finite time and, for the purposes of the present invention, such mixing time in stages after the first stage should be less than about 1.0 millisecond; preferably less than about 0.5 millisecond; more preferably less than about 0.2; for example, from greater than zero to about 0.1 millisecond. Under practical operating conditions, a range of from about 0.05 to about 0.5 milliseconds is useful; particularly 0.05 to about 0.2 milliseconds; for example, about 0.1 milliseconds. The achievement of such short mixing times, and mixing times of even less than about 0.1 milliseconds, may be achieved by use of injector technology such as that described in U.S. Pat. No. 5,883,138, identified above. These short mixing times reflect the need to utilize relatively high interstage temperatures, as well as the high reactivity of the gases under these conditions. As such, mixing times may be longer for the first-stage feed, which is less reactive (since no hydrogen is present) and which may be at lower temperature. Finite mixing times of less than about 10 milliseconds should be achieved for the first stage feed; preferably, from about 0.05 milliseconds to about 5 milliseconds; more preferably from about 0.10 to about 2 milliseconds; generally, mixing times in the first stage of about 5 milliseconds or less are useful.

It has surprisingly been found that the short interstage mixing times referred to above result in a further requirement for a staged-$O_2$ CPO process, which is the requirement of using a moderate number of stages. In a staged-oxygen CPO process, it is important for the gas mixture (in the first stage, the oxygen-containing feedstream and hydrocarbon, e.g., methane, and in later stages, also including the syngas and intermediate reaction products produced in prior stages) to contact the catalyst as a well-mixed stream. If a well-mixed stream is not achieved, $O_2$-rich zones will exist leading to high temperature regions with concurrent poorer selectivity. To accomplish rapid mixing as well as thorough mixing requires substantial cross-stream or intra-stream dispersion. Where interstage mixing time is e.g., 0.1 millisecond, then gas flow even at a speed as high as sonic velocity (e.g., about 331 m/s in air at 0° C. and ambient pressure) can be afforded a mixing distance only in the range of centimeters. Thus, physical mixing devices (such as static mixers) have limited applicability, and mixing energy must come from the momentum of the streams being mixed. The momentum of a stream is defined as the product of the velocity of the stream as it is injected into the mixing zone of the stage (the region preceding the catalyst) multiplied by the stream's mass flow rate. As the number of stages in the staged-$O_2$ CPO process is increased, the amount of oxygen introduced (and, consequently, its mass flow rate) at any one stage is thereby diminished. Thus, for systems with many stages, the volume ratio of the oxygen-containing stream to the continuing fuel stream will be very low. Therefore, the use of an excessive number of stages, each having very low volume ratios of oxygen to fuel (or hydrocarbon) in the gaseous stream, results in an impediment to required rapid and thorough mixing particularly as a consequence of diminished momentum of each oxygen stream. Thus, it also should be appreciated that the momentum of an oxygen stream in a stage in which a relatively low mass flow rate of oxygen is being used, can be increased by mixing the oxygen with a quantity of at least one gas that is inert or substantially inert under the process conditions taught herein, e.g., nitrogen and steam. The use of such a method should be tempered by the knowledge that introduction of a significant volume of inert gas will require increased size of gas handling, and possibly gas recycling, equipment. Without undue experimentation, one skilled in the art can determine a balance between increased momentum and the increased burden on process equipment and operations.

A useful parameter in defining the preferred number of stages is the Oxygen to Fuel-Carbon ratio, or O/FC ratio. The O/FC ratio is herein defined as the ratio of the number of moles of oxygen (as $O_2$) to the number of moles of combustible carbon. In counting moles of combustible carbon, oxygenates are counted, as long as the carbon atom in question can still be further oxidized. Pursuant to this definition, methane counts as one carbon, ethane as two, CO as one, and $CO_2$ counts as zero combustible carbon. This definition differs from an oxygen to carbon ratio, or O/C ratio, cited elsewhere, that excludes carbon atoms bound to oxygen regardless of whether they can be further oxidized. However, such an O/C ratio fails to capture the interstage aspect of having a large mass of continuing partially oxidized components capable of being further oxidized. Thus, for the purposes of the present invention, the O/FC ratio is meaningful both at feed and at interstage conditions. For staged-$O_2$ CPO to be effectively carried out, the O/FC ratio at all stages should be greater than about 0.05; preferably, the O/FC ratio should be greater than about 0.10.

For the reaction:

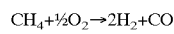

$$CH_4 + \tfrac{1}{2}O_2 \rightarrow 2H_2 + CO$$

the stoichiometric ratio for an idealized feed of pure methane and pure oxygen would be 0.5; if the addition of oxygen were staged so that the ratio was 0.25 in each stage, two stages would be required (barring undesirable reactions/ reaction products). Partial oxidation for syngas generation will have a preferred overall feed stoichiometry (for the process as a whole) in the range of 0.3 to 0.8, preferably 0.4 to 0.8, more preferably 0.4 to 0.7 oxygen molecules per carbon atom of hydrocarbon feed (excluding any carbon atoms bound to oxygen, as well as pursuant to the definition of O/FC defined herein). However, as disclosed hereinabove, the ratio is also dependent on achieving acceptable levels of mixing by utilization of the momentum-accompanying the oxygen stream. In the present invention, it is not necessary to introduce equal amounts of the oxygen-containing feedstream into each stage; whether based on the amount of oxygen per se or the O/FC ratio for each stage, using the measured concentration of fuel carbon present in that stage. Furthermore, some catalysts disclosed as useful herein might provide better results with the introduction of more $O_2$ in earlier stages, or vice versa. Alternatively, different catalysts can be employed at different stages to take advantage of the changed concentration of fuel carbon in each stage; and the preferred oxygen concentration may differ for each catalyst employed. Optimizing the concentration of oxygen for each stage will not require excessive experimentation for those skilled in the art, particularly in view of the limited number of stages that the present invention discloses as preferred. In the practice of the present invention, the O/FC ratio for each stage will be less than about 0.50 in all stages, more preferably less than about 0.40, most preferably less than about 0.30. In summary, in the practice of the present invention, the O/FC ratio for each stage will be greater than about 0.05; in other words from about 0.05 to about 0.50; preferably from about 0.05 to about 0.40; most preferably from about 0.10 to about 0.30. Correspondingly, the operation of the process of this invention, particularly when conducted to obtain high product yield (indicative of achieving high selectivity at high conversion), will be carried out in from about 2 to about 12 stages; preferably from about 2 to about 8 stages; most preferably from about 2 to about 5 stages (in each instance, inclusive of the number of stages recited).

The partial oxidation products generated in the instant process can be recovered and utilized in further synthesis processing, such as Fischer Tropsch synthesis, methanol synthesis, hydrocarbonylation, polymerization, water-gas shift, hydrogen separation, etc. According to a further embodiment of the present invention, the formed useful syngas is cooled, recovered and treated for use in further synthesis processing. Such treatment may include purification to remove low amounts of ammonia and hydrogen cyanide that may be produced in the partial oxidation process. Suitable processes for removing ammonia and hydrogen cyanide from gaseous streams are well known in the art. The removal of ammonia and hydrogen cyanide may be effected in a single step or in a plurality of steps. The cooling steps may be effected before or after the purification treatment steps, as appropriate to accommodate preferred temperatures of the treatment process. Small amounts of hydrogen may be separated from the syngas for use in a hydrocarbon upgrading process.

The treated syngas may be used, e.g., in processes that produce methanol and methanol based products, hydrocarbon synthesis (HCS) products such as liquid hydrocarbons, olefins, alcohols and aldehydes, oxo-synthesis products, ammonia and ammonia based fertilizers and chemicals, town gas and reduction gas used for the production of sponge iron, etc.

In a conventional HCS process, liquid and gaseous hydrocarbon products are formed by contacting the present syngas comprising a mixture of $H_2$ and CO with a suitable Fischer-Tropsch type HCS catalyst, under shifting or non-shifting conditions. Suitable Fischer-Tropsch catalysts comprise one or more Group VIII catalytic metals such as Fe, Ni, Co, Ru, and Re. In one embodiment, the catalyst comprises catalytically effective amounts of Co and one or more of Re, Ru, Fe, Ni, Th, Zr, Hf, U, Mg, La on a suitable inorganic support material, preferably one which comprises one or more refractory metal oxides. Preferred supports for cobalt-containing catalysts comprise titania, particularly when employing a slurry HCS process in which higher molecular weight, e.g., $C_{10+}$ products, primarily paraffinic liquid hydrocarbon products, are desired.

The hydrocarbon products produced by an HCS process according to an embodiment of the present invention are typically upgraded to form suitable products such as, synthetic crude oil, liquid fuels (e.g., jet and diesel), lubricating industrial or medicinal oil, waxy hydrocarbons, olefins (by, e.g., catalytic cracking or steam cracking), etc. Details of these processes are well known to those skilled in the art and need not be described here. All or a portion of the HCS products can be fractionated and then converted in one or more steps with or without a suitable catalyst or in the presence of hydrogen or both. Hydroconversion is usually preferred and includes mild hydrotreating (resulting in minimal branching) to make pumpable liquids, hydroisomerization (somewhat more branching, e.g., 25 to 85% and, preferably mono-methyl branching) for making distillates such as jet fuels and diesel fuels, and more severe hydroisomerization (where virtually all, e.g., less than 10 wt. % and preferably less than 5 wt. % of the feed remains unconverted) to make lube oils. These processes are also well known and reported in the literature in so far as catalysts and reaction conditions are concerned.

The ranges and limitations provided in this specification and claims are those that are believed to particularly point out and distinctly claim the instant invention. However, it is understood that other ranges and limitations that perform substantially the same function in substantially the same way to obtain the same or substantially the same result are intended to be within the scope of the instant invention as defined by this specification and claims.

The process of the present invention is further described by way of the following illustrative examples which are not intended to limit the scope of the invention in any manner whatsoever.

EXAMPLES

Low Pressure Examples from Laboratory Unit

Example 1

Inlet Temperature for First Stage

A catalyst of Rh on alumina foam (0.75" Diameter×0.5" Length) was tested for CPO activity in a "1st stage" test. The Rh content of the catalyst was approximately 0.15% by weight. The Rh was applied as part of an alumina-based washcoat at a loading of 0.34 g/in$^3$ (0.0207 g/cm$^3$). Rh content in the washcoat was approximately 5% by weight. The alumina foam support had an average pore diameter of 300 microns.

A quartz reactor enclosed in a furnace was used to contain the catalyst. The furnace was used to control catalyst inlet temperature and minimize heat loss from the catalyst bed. Product gases, CO, $CO_2$, $H_2$, $C_2H_2$, $C_2H_4$, $C_2H_6$, were quantified by GC (there was no detectable $O_2$ in the product stream). Water concentration in the product streams was calculated by difference. All carbon balances closed between 99.5–100.5%. All runs were carried out at 6–8 psig±0.5 psig.

The gas flow rate, expressed as gaseous hourly space velocity (GHSV) in all runs was 144,200/hr. (As noted earlier, this value is calculated as the flow rate of the gases at "standard" temperature and pressure, i.e., 1 atm/101.3 kPa and 68° F./20° C., divided by the total volume of the catalyst).

In this example, a $CH_4:O_2$ ratio of 4.0 was used, which corresponds to an overall CPO stoichiometry having a $CH_4/O_2$ ratio of 2.0 and 50% of the oxygen introduced in the first stage of a two-stage process. Under these conditions, oxygen is a limiting reagent, and, at most, 2 moles of $CH_4$ can be oxidized per mole of $O_2$. A "prorated" conversion was computed as defined hereinabove, i.e., moles of $CH_4$ converted per ½ mole of $O_2$ in the feed; the O/FC ratio was 0.25. (Product selectivity is also calculated as defined hereinabove). The table below shows steady state conversions and syngas selectivity as a function of catalyst inlet temperature.

| Inlet temp (° C.) | Prorated $CH_4$ % Conversion | % CO Selectivity | % $H_2$ Selectivity |
|---|---|---|---|
| 404 | 87.0 | 94.8 | 95.8 |
| 503 | 92.7 | 96.4 | 98.1 |
| 603 | 97.1 | 97.9 | 99.7 |
| 672 | 98.5 | 98.5 | 100 |

Prorated $CH_4$ % Conversion=½($CH_4$ in–$CH_4$ out)×100/($O_2$ in)

No. $C_2$'s observed in any of the tests carried out in this example. All product carbon not contained in product CO was accounted for in product $CO_2$.

This example shows that raising catalyst inlet (mixture) temperature has a positive impact on conversion and syngas selectivity under 1st stage operating conditions. Conversion and selectivity is dramatically better with higher feed preheat temperatures, and above 600° C. the yields and selectivity approaches the ideally obtainable (100%) level. This example shows that first stage feed preheat temperatures should be above 450° C., and most preferably above 550° C. to achieve preferred levels of conversion and selectivity.

Example 2
Inlet Temperature for Subsequent Stages

A Rh metal catalyst on yittria stabilized zirconia foam support (0.75" Diameter×0.5" Length) was tested for CPO activity in a test simulating the 2nd stage of a 5-stage CPO. The Rh content of the catalyst was approximately 0.11% by weight. The Rh was applied as part of an alumina-based washcoat at a loading of 0.31 g/in³ (0.0189 g/cm³). Rh content in the washcoat was approximately 5% by weight. The yittria stabilized zirconia foam support had an average pore diameter of 300 microns. The 2nd stage (of 5) simulated feed consisted of 1 L/min of $O_2$, 8.15 L/min of $CH_4$, 1.8 L/min of CO, 3.6 L/min of $H_2$, and 0.2 L/min of He (as an internal standard for GC). The O/FC ratio was 0.1005.

A quartz reactor enclosed in a furnace was used to contain the catalyst. The furnace was used to control catalyst inlet temperature and minimize heat loss from the catalyst bed. Product gases, CO, $CO_2$, $H_2$, $C_2H_2$, $C_2H_4$, $C_2H_6$, were quantified by GC (there was no detectable $O_2$ in the product stream). Water concentration in the product streams was calculated by difference. All carbon balances closed between 99.5–100.5%. All runs were carried out at 5.5–6.5 psig±0.5 psig and GHSV in all runs was 235,000/hr.

The table below shows steady state prorated methane conversions and syngas selectivities as a function of catalyst inlet temperature. Under these conditions, oxygen is a limiting reagent, and, at most, 2 moles of $CH_4$ can be oxidized per mole of $O_2$. Prorated conversion is computed as noted hereinabove and formulas for conversion and selectivity are also defined previously. Oxygen was not present in the product gas stream, indicating 100% oxygen conversion. Total $C_2$ concentration in the product gas stream was <0.02% under all test conditions.

| Inlet temp (° C.) | Prorated $CH_4$ % Conversion | % CO Selectivity | % $H_2$ Selectivity |
|---|---|---|---|
| 498 | 80.6 | 91.4 | 96.2 |
| 551 | 85.2 | 93.1 | 98.1 |
| 603 | 88.0 | 94.8 | 99.9 |
| 661 | 91.1 | 95.3 | 100.3 |

Prorated $CH_4$ % Conversion=½($CH_4$ in–$CH_4$ out)×100/($O_2$ in)

% CO Selectivity=(CO out)–(CO in)×100/($CH_4$ in–$CH_4$ out)

% $H_2$ Selectivity=½($H_2$ out–$H_2$ in)×100/($CH_4$ in–$CH_4$ out)

This example demonstrates the benefit of increasing the mixture temperature to the inlet of the catalyst downstream of the 1st stage catalyst. As seen in the table above, methane conversion and syngas selectivity is dramatically better with higher catalyst inlet temperature. This indicates that $CH_4$ is able to compete fairly effectively with CO and $H_2$ for oxygen in the feed. This example illustrates that at catalyst inlet temperature for each stage after stage 1 should be kept above 600° C. In this example, there is still some unachieved potential for higher conversion and CO selectivity to be obtained by increasing the inlet temperature even higher. Thus, this example suggests that catalyst inlet temperatures for stages after stage 1 be preferably kept above 700° C. However, the apparatus used here does not have premix feed residence times below 1 millisecond, and thus was unable to operate at higher feed temperature due to difficulties with gas phase pre-ignition.

Example 3
Combined Yields for a 2-Stage CPO System Bed

A Rh metal catalyst on a support of alumina foam (0.75" Diameter×0.5" Length) was tested for CPO activity in a 2-stage test. The Rh content of the catalyst was approximately 0.24% by weight. The Rh was applied as part of an alumina-based washcoat at a loading of 0.36 g/in³ (0.02197 g/cm³). Rh content in the washcoat was approximately 10% by weight. The alumina foam support had an average pore diameter of 300 microns. A quartz reactor enclosed in a furnace was used to contain the catalyst. The furnace was used to control catalyst inlet temperature and minimize heat loss from the catalyst bed. Product gases, CO, $CO_2$, $CH_4$, $H_2$, $C_2H_2$, $C_2H_4$, $C_2H_6$, and $O_2$ were quantified by GC. Water concentration in the product streams was calculated by difference. All carbon balances closed between 99.5–100.5%. All runs were carried out at 9–13 psig ±0.5 psig.

The 2-stage test consisted of a series of runs at different temperatures and feed compositions generally designed to mimic either a "1st stage" or a "2nd stage" operating condition. Results for various combinations of (1st+2nd) stage runs were determined. The fraction of oxygen added over the 1st stage was 60%, with 40% of the oxygen being added over the 2nd stage. The O/FC ratio for stage 1 was 0.3 (2.55/8.5); the 2nd stage O/FC ratio was 0.205 for the 406°

C. runs and 0.202 for the 572° C. runs (calculated based on the measured product distribution). Methane/oxygen ratio over the two combined stages was 2.0. Total methane feed to the combined stages was 8.5 L/min, all of which was introduced to the 1$^{st}$ stage. Total oxygen feed to the combined stages was 4.25 L/min with 2.55 L/min being added to the "1st stage" and 1.7 L/min of oxygen being added to the "2nd stage". First stage GHSV was 186,475/hr. The feed to the "2nd stage" tests consisted of the products of the "1st stage" tests (minus $CO_2$ and $H_2O$) plus 1.7 L/min of additional oxygen. In this manner, CO and $H_2$ plus unconverted $CH_4$ were allowed to react over the catalyst in 2nd stage tests with a gas inlet temperature of either 400° C. or 500° C.

The data table below clearly shows the benefit of using high inlet (mixture) temperatures in both 1st and 2nd stages. The best combination of feed mixture temperatures in this series of tests was 572° C. for the 1st stage and 500° C. for the 2nd stage. This combination gave an integrated 2-stage methane conversion of 90.1%. Lower levels of preheat to either the 1st or 2nd stage resulted in lower methane conversions and syngas selectivity.

| Inlet temp (° C.) 1$^{st}$ stage test | Inlet temp (° C.) 2$^{nd}$ stage test | % Methane conversion | % CO Selectivity | % $H_2$ Selectivity |
|---|---|---|---|---|
| 406 | 399 | 85.3 | 93.2 | 90.9 |
| 406 | 502 | 86.8 | 93.8 | 91.9 |
| 572 | 400 | 88.1 | 94.7 | 91.7 |
| 572 | 500 | 90.1 | 95.2 | 92.6 |

Conversion and selectivity calculated based on the feed to the combined beds (i.e., % methane conversion=($CH_4$in–$CH_4$ out)×100/$CH_4$ in). No $C_2$'s were observed; all product carbon was accounted-for as CO or $CO_2$.

The amount of preheat which could be used in these tests was limited by the reactor design. Further increases in preheat to either the 1st stage or subsequent stages, within the ranges described herein, will result in even higher conversions and syngas selectivity, provided that gas phase chemistry is minimized by rapid and thorough mixing of feeds and rapid introduction of those mixed feeds into the catalyst stage. Furthermore, since the purpose of this example was simply to demonstrate the qualitative effects of increasing preheat to 1st and subsequent stages, no attempt was made to optimize number of stages, exact level of preheat, interstage mixing times, or oxygen partitioning. By following the teachings disclosed herein, even higher conversions and syngas selectivity may be obtained than observed in this example.

High Pressure Multi-Stage Examples Using Simulations

In order to demonstrate the effect of important process variables at higher pressure, a model was created that included the CPO catalytic chemistry described by Hickman & Schmidt (AIChE J., 39 (1993) 1164–1177), the gas phase chemistry described by Mims, et al. (J. Phys. Chem., 98 (1994) 13357–13372), and including chemical engineering heat and mass transfer principles for processes in a reacting gas/solid flow system. The results of this model are presented in Examples 4–6.

Example 4

Effect of Interstage Mixing Times

In Example 4, the 1st stage mixture preheat is 500° C., and there is no interstage cooling. Thus, subsequent-stage inlet temperature is the mix temperature that results from adding the specified amount of 500° C. oxygen to the effluent of the previous stage. In all cases, the total pressure is 20 atm (absolute), the overall $O_2/CH_4$ ratio is 0.5, and oxygen is distributed evenly among the stages. Mixing times before each catalytic stage is simulated by an adiabatic holding time of the fully mixed gas stream to be fed to the catalyst.

|  | Mix Time | 1-Stage (co-fed) | | 3-Stage | | 6-Stage | |
|---|---|---|---|---|---|---|---|
|  |  | % $CH_4$ Conversion | % $H_2$ + CO Selectivity | % $CH_4$ Conversion | % $H_2$ + CO Selectivity | % $CH_4$ Conversion | % $H_2$ + CO Selectivity |
| 4A | 10 ms | 84.6 | 93.5 | 78.7 | 77.3 | 72.0 | 72.1 |
| 4B | 1.0 ms | 84.6 | 93.5 | 77.1 | 80.6 | 77.1 | 80.9 |
| 4C | 0.1 ms | 84.6 | 93.5 | 79.4 | 90.8 | 83.1 | 92.7 |
| 4D | .01 ms | 84.6 | 93.5 | 90.4 | 96.1 | 93.8 | 97.3 |

% Selectivity = 100 (moles (CO + $H_2$))/3 (moles ($CH_4$ in - $CH_4$ out))

This example compares predicted overall conversion and selectivity for mixing times of 10, 1.0, 0.1 and 0.01 seconds. For single-stage (co-fed) CPO, yields are not improved by reducing mix time from 10 to 1 or to 0.1 milliseconds. This is because $CH_4/O_2$ mixtures have relatively low reactivity at 1st-stage feed temperatures. However, for multi-stage CPO, it is seen that reducing mix time to 0.1 or to 0.01 milliseconds results in a profound improvement of yields. If unacceptably long mixing times are employed (4A, 4B), the yields and selectivities from staged-$O_2$ CPO are worse than co-fed CPO. With preferred mixing times below 0.1 ms (4D), staged-$O_2$ CPO yields and selectivities are better than those of co-fed CPO. This example also shows that, when gas phase reactions can be avoided (i.e. with adequately short mixing times), the conversion and selectivity improves with increasing numbers of stages (4D).

Example 5

Effect of Inter-Stage Cooling

In this example, the inter-stage products of Example 4 (above) are cooled to the extent necessary, prior to mixing with oxygen, to provide a mixture with oxygen at 550° C., and, furthermore, experience the indicated mixing delay time. However, cooling is effected only where the product temperature from the prior stage exceeds 550° C.; otherwise the temperature of the product from the prior stage is not modified. (Note that the co-fed case has no interstage location. Results from Example 4 are repeated here and in example 6 for reference).

|  | | 1-Stage (co-fed) | | 3-Stage | | 6-Stage | |
|---|---|---|---|---|---|---|---|
|  | Mix Time | % CH$_4$ Conversion | % H$_2$ + CO Selectivity | % CH$_4$ Conversion | % H$_2$ + CO Selectivity | % CH$_4$ Conversion | % H$_2$ + CO Selectivity |
| 5A | 10 ms | 84.6 | 93.5 | 83.1 | 92.9 | 84.5 | 93.3 |
| 5B | 1.0 ms | 84.6 | 93.5 | 83.4 | 93.0 | 85.1 | 93.7 |
| 5C | 0.1 ms | 84.6 | 93.5 | 83.4 | 93.1 | 85.2 | 93.7 |
| 5D | .01 ms | 84.6 | 93.5 | 83.5 | 93.1 | 85.2 | 93.7 |

Under conditions where uncooled products result in poor yields due to gas phase reaction (4A, 4B), cooling between stages to temperatures such as 550° C. can improve yields. However, the yields and selectivities obtained in these staged cases (5A, 5B) are not significantly better than the co-fed case. Under conditions where the uncooled products showed improved yields for staging (4D), cooling between stages to temperatures such as 550° C. (5D) results in yields and selectivities that are worse than those obtained without cooling. Cooling to such a low temperature limits the yields that may be obtained to yields that are comparable to single-stage co-fed CPO.

This example shows that cooling between stages to temperatures such as 550° C. is not desirable when other key parameters (such as interstage mixing time) are properly set.

Example 6
Preferred Inter-Stage Cooling

In this example, the inter-stage products of Example 4 (above) are cooled to 750° C. prior to mixing with oxygen and experiencing the indicated mixing delay time.

|  | | 1-Stage (co-fed) | | 3-Stage | | 6-Stage | |
|---|---|---|---|---|---|---|---|
|  | Mix Time | % CH$_4$ Conversion | % H$_2$ + CO Selectivity | % CH$_4$ Conversion | % H$_2$ + CO Selectivity | % CH$_4$ Conversion | % H$_2$ + CO Selectivity |
| 6A | 10 ms | 84.6 | 93.5 | 63.3 | 68.9 | 43.0 | 61.0 |
| 6B | 1.0 ms | 84.6 | 93.5 | 67.5 | 78.3 | 70.0 | 83.7 |
| 6C | 0.1 ms | 84.6 | 93.5 | 88.7 | 95.3 | 91.8 | 96.5 |
| 6D | .01 ms | 84.6 | 93.5 | 89.3 | 95.7 | 92.8 | 97.0 |

In the case where gas phase reaction occurs because there is too much interstage mixing time (6A, 6B), cooling between stages to temperatures such as 750° C. may not be able to "rescue" the operation. In fact, such cooling can result in worse yields than the uncooled (4A, 4B) operation. At very short (0.01 ms) mixing times where the gas phase chemistry is completely eliminated, cooling to 750° C. (6D) results in a very slight loss of yields compared to an adiabatic, (uncooled) operation (4D). However, at intermediate mixing times (e.g., 0.1 ms), there can be a dramatic improvement of yields as one switches from uncooled operation (4C) to one that is cooled to 750° C. (6C).

This example demonstrates that the combination of appropriately short mixing times with appropriately high interstage temperatures (e.g., 6C, 6D) can result in a dramatic improvement in yields for the staged-process over the co-fed process. It also demonstrates that there is some tradeoff between interstage temperature and mixing residence time. While the optimal yields are achieved with minimum mixing time (4D), yields that approach the optimal can also be achieved with more relaxed mixing time requirements if a modest (750° C.) level of interstage cooling is applied (6C).

What is claimed is:

1. A multistage catalytic partial oxidation (CPO) process for oxidizing a hydrocarbon feedstream comprising $C_1$–$C_4$ hydrocarbons, with an oxygen-containing feedstream to produce syngas, an intermediate or final product comprising CO and $H_2$, said process conducted under CPO conditions in the presence of a CPO catalyst, wherein:

(A) the total oxygen requirement for said process is introduced incrementally from an oxygen-containing feedstream, the first of said incremental additions taking place in a first reaction stage, and subsequent said incremental additions taking place in at least one subsequent reaction stage, each said stage including said catalyst;

(B) in said first reaction stage said oxygen-containing feedstream and said hydrocarbon feedstream are mixed, and in said subsequent reaction stages, said oxygen-containing feedstream and said intermediate product produced in the prior stage are mixed; said mixing in said first stage occurring in a mix time of less than 10 milliseconds and in said subsequent reaction stages said mixing of said oxygen-containing feedstream and said intermediate product occurring in a mix time of less than 1 millisecond, wherein said mix time is defined as the time when said hydrocarbon and said oxygen-containing feedstreams or said intermediate product and said oxygen-containing feedstream are brought into contact with one another and up to the time said mixture is contacted with said catalyst, to form a mixture, wherein said mixture is contacted with said catalyst;

(C) said oxygen-containing feedstream and said hydrocarbon feedstream are preheated prior to entry into said first stage, to a mixture temperature of from about 450° C. to less than 1,000° C.; and (D) the mixture temperature of said product in each stage following said first stage is from greater than 600° C. to: less than 1000° C.

2. The process of claim 1 comprising at least two but less than or equal to twelve stages.

3. The process of claim 2 comprising at least two but less than or equal to five stages.

4. The process of claim 1 in which the oxygen to fuel carbon ratio, O/FC, for the overall process is from about 0.3 to about 0.8.

5. The process of claim 1 in which the first stage preheat temperature recited in step (C) is greater than 550° C.

6. The process of claim 1 conducted at a pressure of from about 1 to about 50 atmospheres (from about 0.1 to about.5.0 MPa).

7. The process of claim 6 conducted at a pressure of from about 1 to about 30 atmospheres (about 0.1 to about 3.0 MPa).

8. The process of claim 4 wherein said O/FC for each stage is greater than about 0.05.

9. The process of claim 1 wherein said mix time in said subsequent stages is from about 0.05 to about 0.5 milliseconds.

10. The process of claim 1 in which each of said mixture temperatures in step (D) is from greater than 700° C. to less than 1000° C.

11. The process of claim 1 wherein said catalyst comprises at least one metal selected from the group consisting of the elements of Group VIII of the Periodic Table of the Elements.

12. The process of claim 11 wherein said at least one metal is selected from the group consisting of nickel, ruthenium, rhodium, palladium, osmium, iridium and platinum.

13. The process of claim 12 wherein said catalyst is deposited on a support comprising a ceramic foam or a fixed bed of catalyst particles.

14. The process of claim 1 wherein said mixture in any stage is substantially uniform, as characterized by an efficiency of mixing, $E_m$, in said stage of from about 0.8 to about 1.

15. The process of claim 14 wherein $E_m$ is from about 0.85 to about 0.995.

16. The process of claim 1 in which the preheat of step (C) is accomplished, at least in part, by the use of a heat exchange means employing as a heat source at least a portion of the product resulting from said CPO process.

17. The process of claim 1 in which the overall conversion of $C_1$ hydrocarbons is greater than 90%.

18. The process of claim 17 in which hydrogen and carbon monoxide selectivity each exceed 85%.

19. The process of any of claims 1, 2 or 3 in which an inert gas is included with said oxygen-containing feedstream introduced in one or more of said first or subsequent reactions stages in order to increase the momentum of said feedstream.

20. The process according to claim 1 that comprises the step of further processing the syngas via methanol synthesis processes or the Fischer-Tropsch reaction to produce liquid hydrocarbons.

21. The process according to claim 20 that comprises the further step of reacting said liquid hydrocarbons by hydroconversion.

* * * * *